July 4, 1961
M. H. GREENFIELD
2,991,464
AZIMUTH TARGET GATING SYSTEM
Filed Oct. 7, 1958
3 Sheets-Sheet 1
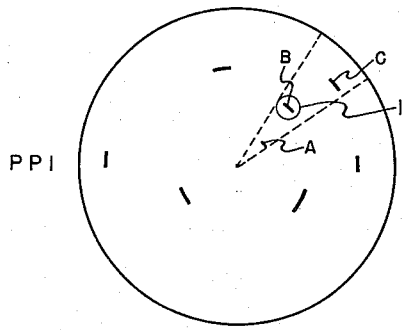
Fig_1
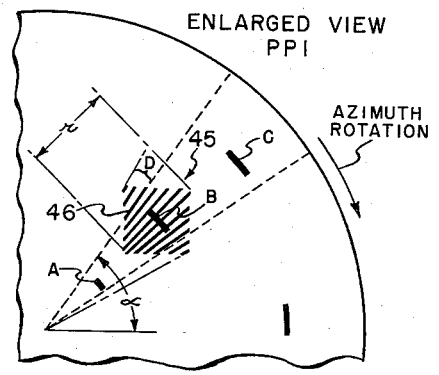
Fig_2
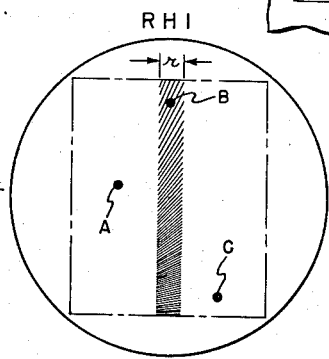
Fig_3
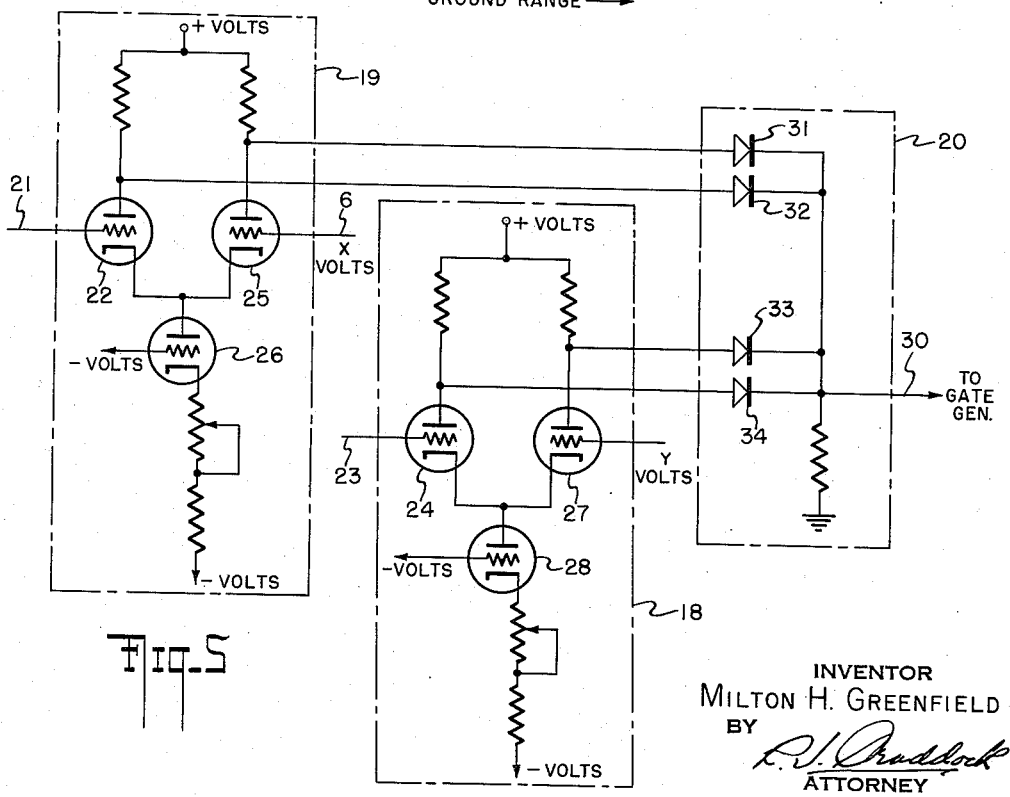
Fig_5
INVENTOR
MILTON H. GREENFIELD
BY
R.V. Craddock
ATTORNEY July 4, 1961
M. H. GREENFIELD
2,991,464
AZIMUTH TARGET GATING SYSTEM
Filed Oct. 7, 1958
3 Sheets-Sheet 2
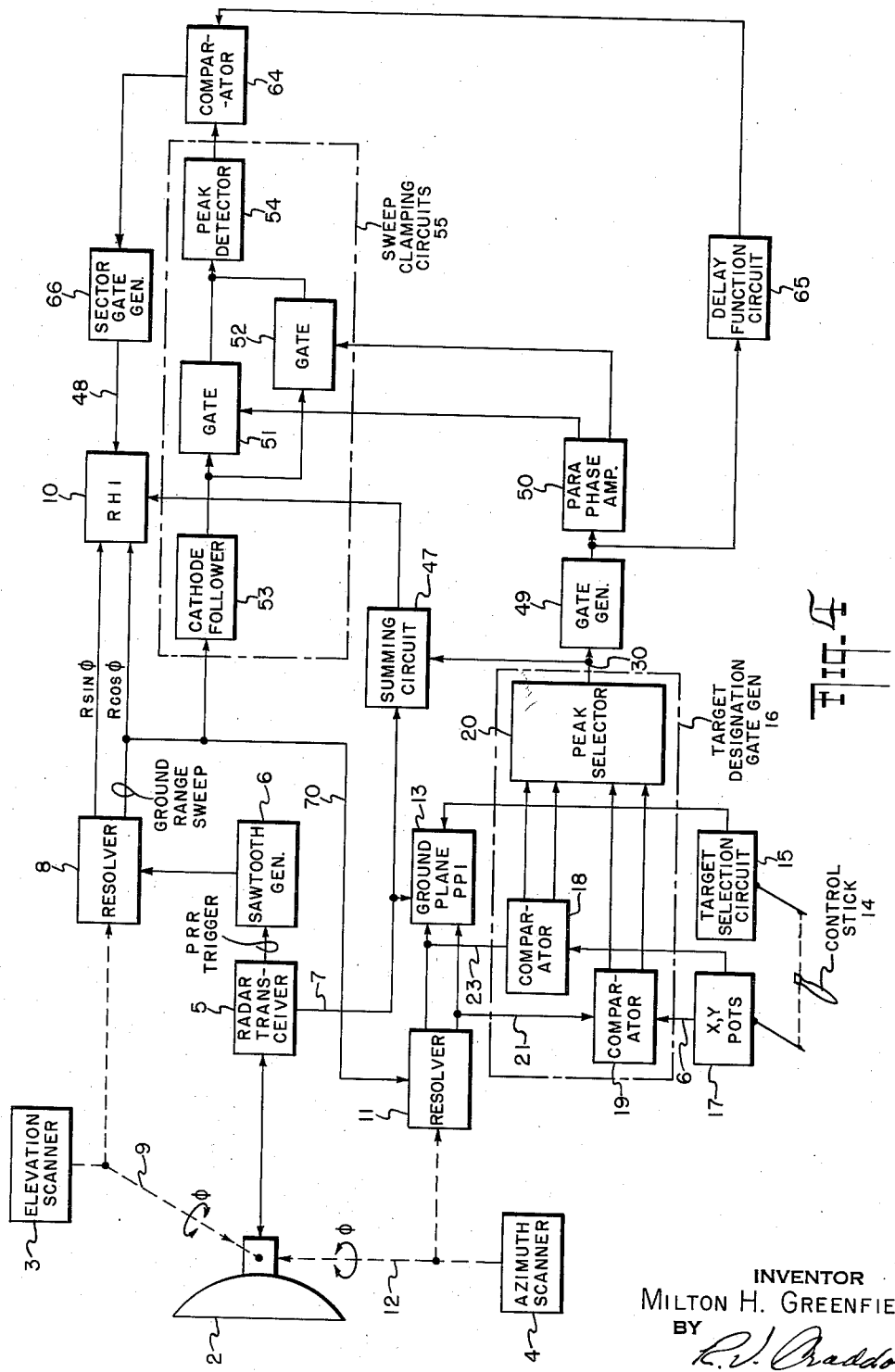
INVENTOR
MILTON H. GREENFIELD
BY
R. J. Craddock
ATTORNEY July 4, 1961 M. H. GREENFIELD 2,991,464
AZIMUTH TARGET GATING SYSTEM
Filed Oct. 7, 1958 3 Sheets-Sheet 3

INVENTOR
MILTON H. GREENFIELD
BY
R. J. Craddock
ATTORNEY

United States Patent Office 2,991,464
Patented July 4, 1961

2,991,464
AZIMUTH TARGET GATING SYSTEM
Milton H. Greenfield, Bronx, N.Y., assignor to Sperry Rand Corporation, a corporation of Delaware
Filed Oct. 7, 1958, Ser. No. 765,845
7 Claims. (Cl. 343—5)

The present invention generally relates to target surveillance radar systems and, more particularly, is concerned with selectable target gating means for the display of data respecting targets located within a predetermined azimuth sector.

In airport traffic surveillance, for example, it is desirable that certain positional data respecting incoming and departing aircraft be made available to the traffic control center. Such data includes aircraft range, height, and azimuth position relative to the control center. Under certain conditions, however, particularly when a plurality of aircraft are located within substantially the same azimuth sector, it becomes necessary to examine in more detail the relative spatial positions of the aircraft within said azimuth sector to determine whether a collision situation is developing.

The first indication of such a dangerous potentiality ordinarily appears on the face of a target indicator such as a PPI which shows the ranges and bearings of all the aircraft about the airport. When the PPI discloses the presence of a plurality of aircraft within substantially the same azimuth sector, further details respecting the relative spatial position of the aircraft within said sector may be ascertained by means of an auxiliary indicator, for example, an RHI which displays height data not shown on the PPI. In order to avoid possible confusion in the interpretation of the data displayed on the RHI, it is of advantage that solely the targets located within the azimuth sector of interest be shown to the exclusion of all other targets. Additionally, the correlation of the data displayed on the RHI with that shown on the PPI is further facilitated by the unambiguous identification of a predetermined one of the targets shown on the RHI.

It is the general object of the present invention to provide radar target data display means for the presentation of readily identifiable data respecting targets lying within a predetermined and selectable azimuth sector.

Another object is to provide means responsive to a positionable range-azimuth gate for the generation of a control signal activating an auxiliary target display indicator during the time that an azimuthally scanning radar beam is positioned within a predetermined azimuth sector.

A further object is to provide azimuth sector gate generating means responsive to a positionable range-azimuth gate for the generation of a control signal producing constant azimuth sector display of target data irrespective of the range setting of the positionable range-azimuth gate.

These and other objects of the present invention as will appear to those skilled in the art from a reading of the following specification are achieved in a preferred embodiment by the provision of means including a PPI type of radar target display. Positionable target selection means are also provided for the selection of a predetermined one of the targets appearing on the face of the PPI. Concurrently with the selection of the predetermined target, a positionable target designation gate is generated at the range and azimuth of the selected target.

The target designation gate is produced once per azimuth revolution of the radar scanning means each time that the radar beam traverses the azimuth position of the selected target. The center of the designation gate coincides with the range and azimuth position of the selected target and persists for a predetermined length of time irrespective of the range of the designation gate.

The present invention contemplates the production of an azimuth sector control signal in response to the occurrence of the designation gate, for the display on an auxiliary indicator of additional data respecting targets lying within a predetermined azimuth sector centrally embracing the azimuth position of the selected target. The azimuth sector control signal generating means is adapted to produce a control signal representing a constant azimuth sector irrespective of the range at which the designation gate appears.

For a more complete understanding of the present invention, reference should be had to the following specification and to the appended figures of which:

FIG. 1 represents a conventional PPI target data display;

FIG. 2 represents an enlarged view of a portion of the target data displayed on the indicator of FIG. 1;

FIG. 3 represents the target data display of an illustrative auxiliary indicator for use with the present invention;

FIG. 4 is a block diagram of a preferred embodiment of the present invention;

FIG. 5 is a schematic diagram of the target designation gate generator of FIG. 4;

Figure 6:
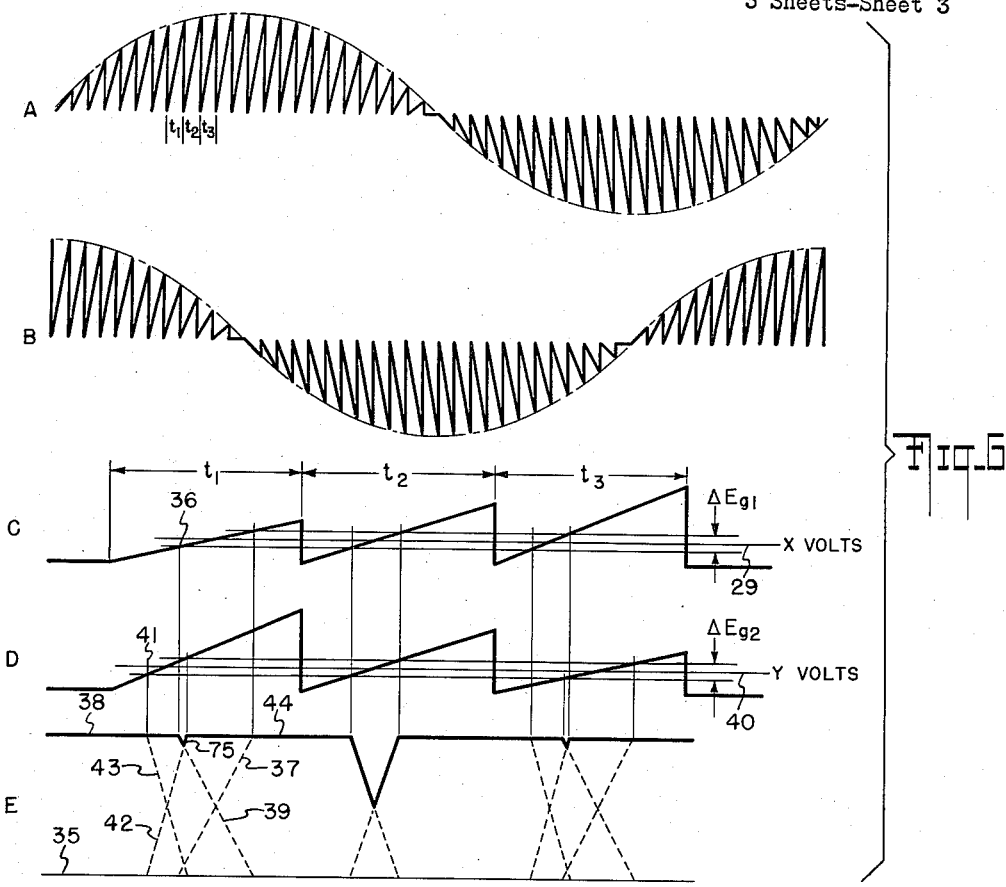
FIG. 6 is a series of waveforms useful in explaining the operation of the apparatus of FIG. 5.

A representative display of target data on a PPI is shown in FIG. 1. The range and azimuth positions of the indicated targets are representative of those which might be present in an airport traffic surveillance operation. By inspection of the indication of FIG. 1, it can be seen that the majority of indicated targets lie at substantially different ranges and azimuths with the exception of the targets designated by the letters A, B, and C. Target aircraft A, B, and C, being located at substantially the same azimuth require further scrutiny to fully assess the possible development of a collision situation. For such evaluation, the present invention provides for the production of the indication illustrated in FIG. 3 wherein additional data (in this case aircraft height) is displayed. It will be noted that only aircraft A, B, and C are displayed in the indication of FIG. 3.

The criterion for the selective indication of FIG. 3 is a predetermined azimuth sector centrally located about the position of a predetermined one of the aircraft A, B, and C (in this case aircraft B). In a representative case, it may be desirable to communicate verbal instructions to the pilot of aircraft B for the safe navigation of the aircraft under his command.

Prior art means may be provided for the encirclement of target B on the PPI display of FIG. 1. Concurrently with the generation of positionable target selection circle 1, a target designation gate is electronically produced at the same range and azimuth as those of the selected target B. The designation gate, per se, is not necessarily displayed on the PPI but is indicated at 45 in the enlarged view of FIG. 2 to illustrate its centrally embracing position with respect to target B. As will be seen, the designation gate of FIG. 2 occupies a predetermined area on the face of the PPI irrespective of the range position of the range gate.

As previously mentioned, the target data display of FIG. 3 is limited to those targets lying within a constant predetermined azimuth sector about the azimuth position of the selected target B. Inasmuch as the designation gate illustrated in FIG. 2 occupies a constant range and azimuth area, the azimuth angle subtended by the gate would vary as a function of its range. For this reason, the designation gate cannot be used directly to activate the display of FIG. 3. Accordingly, a separate control signal is produced by the present invention for the production of the display of FIG. 3 so that a constant azimuth sector is shown irrespective of the range of the designation gate of FIG. 2.

Provision is made for the display of the designation gate (lightly shaded area) on the indication of FIG. 3. The indications representing targets A, B, C on the display of FIG. 3 is made more intense than that of the designation gate. Thus, the displayed designation gate of FIG. 3 facilitates the rapid correlation of the target data of FIG. 3 with that shown in FIG. 1.

A preferred embodiment of the present invention for the generation of the indications of FIGS. 1 and 3 is shown in FIG. 4. In FIG. 4, a paraboloidal antenna 2 is caused to scan in elevation and in azimuth, respectively, by scanning means 3 and 4. Antenna 2 is energized by radar transceiver 5. Transceiver 5 produces pulse repetition rate triggers for the activation of slant range sawtooth generator 6 and a video signal output on line 7, the latter of which is applied to ground plane PPI 13. The sawtooth signal output of generator 6 is applied to the electrical signal input to resolver 8. The rotor of resolver 8 is driven by the same shaft 9 which scans antenna 2 in elevation.

Two sawtooth output signals are produced by resolver 8, in a conventional manner, one having instantaneous values proportional to height (i.e., proportional to the product of slant range and the sine of the elevation angle $\phi$) and the other having instantaneous values proportional to ground range (i.e., proportional to the product of slant range and the cosine of the elevation angle $\phi$). The height and ground range signals are directly applied to the deflection electrodes of RHI 10. The video signal appearing on line 7 is also applied via summing circuit 47 to RHI 10.

The signal representing ground range is applied by line 70 to the electrical signal input to resolver 11. The rotor of resolver 11 is driven by the same shaft 12 which scans antenna 2 in azimuth. Consequently, two sawtooth signals are produced at the output of resolver 11 having instantaneous values proportional to the respective rectilineal coordinates of points lying in the ground plane at the azimuth along which the beam of antenna 2 is directed. The resolved signals are directly applied to the deflection electrodes of ground plane PPI 13.

PPI 13, in an illustrative case, may be of the modified type shown in U.S. Patent 2,603,775, issued on July 15, 1952, in the name of Rodney D. Chipp. As shown in the patent, PPI 13 includes a dual electron gun cathode ray tube. Separate means are provided for the independent deflection of each of the electron beams which trace superimposed images on the common face of the cathode ray tube. One of the beams is deflected in a conventional manner by the resolved sweep outputs of resolver 11 so as to produce the usual ground plane PPI display. The other beam is controlled so as to generate on the common face of the cathode ray tube a positionable circular trace such as circle 1 of FIG. 1. The range and azimuth position of the circular trace is manually positionable by means of a control stick 14. The deflection circuits of the aforementioned patent, utilized in the generation of the circular trace, are represented by target selection circuit 15.

The outputs of resolver 11 are applied as electrical signal inputs to target designation gate generator 16. Two additional electrical signal inputs to generator 16 are derived from the outputs of $x$, $y$ potentiometers 17, the sliders of which are positioned by control stick 14. Control stick 14 positions the sliders of potentiometers 17 by conventional mechanical linkages whereby electrical signals are produced at the respective sliders which are proportional in amplitude and polarity to the rectilineal coordinates of the displaced position of control stick 14 relative to its neutral position. Target designation gate generator 16 is comprised of comparators 18 and 19 and peak selector 20.

The schematic details of generator 16 are shown in FIG. 5 which will be described in connection with the waveforms of FIG. 6. The $x$-resolved sweeps, appearing on line 21 at the output of resolver 11, are applied to the grid of triode 22. Similarly, the $y$-resolved sweeps, appearing on line 23 at the output of resolver 11, are applied to the grid of triode 24.

The cathodes of triodes 22 and 25 are connected to the plate of triode 26. Triode 26 acts as a source of constant current for triodes 22 and 25. The grid and cathode of triode 26 are respectively returned to sources of negative potential. Triodes 22, 25, and 26 together comprise comparator 19 of FIG. 4. The electrical signal output of potentiometers 17 representing the $x$ coordinate of control stick 14 is applied to the grid of triode 25.

The cathodes of the triodes 24 and 27 are connected to the plate of triode 28. Triode 28 produces a constant current for the energization of triodes 24 and 27. The grid and cathode of triode 28 are returned to respective sources of negative potential. Triodes 24, 27, and 28 together comprise comparator 18 of FIG. 4. The electrical signal output of potentiometers 17 representing the $y$ coordinate of control stick 14 is applied to the grid of triode 27.

The waveform of FIG. 6A is generally representative of the $x$-resolved sweeps which are applied to the grid of triode 22 during one complete azimuth rotation of antenna 2. The peak values of the sweeps vary in a sinusoidal manner assuming, for purposes of illustration, the constant azimuth rotation of shaft 12 which drives the rotor of resolver 11. Similarly, the waveform of FIG. 6B represents the $y$-resolved sweeps which are applied to the grid of triode 24.

The grid of triode 25 is quiescently biased by the $x$-coordinate voltage such that the total constant current of triode 26 initially passes through triode 25 cutting off triode 22. As the potential on the grid of triode 22 increases, in accordance with the lineally rising sweep voltage applied thereto, a point will be reached at which the states of conduction of triodes 22 and 25 begin to invert with the total constant current being passed by triode 22. This is shown diagrammatically in the waveform of FIG. 6C. For purposes of illustration, three successive sawtooth waves are indicated which occur during the intervals designated $t_1$, $t_2$, and $t_3$ in FIG. 6A. It should be borne in mind that the amplitudes of such three successive sawtooth waves may be virtually indistinguishable from each other. The actual relative amplitudes have been exaggerated for the sake of clarity of exposition. The D.C. potential representing the $x$ coordinate of control stick 14 is represented by line 29. The vertical increment designated $\Delta E_{g1}$ represents the grid voltage region of triode 22 in which the states of conduction of triodes 22 and 25 invert as is determined by their control characteristics. Each of the plates of triodes 22 and 25 is connected through a respective diode 32 and 31 to output terminal 30 of FIG. 5. The diodes are so poled that the potential of output terminal 30 follows the most positive potential applied to diodes 31, 32, 33, and 34.

There is shown in FIG. 6E a plot of the manner in which the potentials, appearing at the plates of triodes 22 and 25, vary with respect to the lineally increasing potential applied to the grid of triode 22. Assuming, for example, that triode 25 is initially conducting, the potential at the plate thereof assumes the depressed value represented by line segment 35 of FIG. 6E. As the sawtooth of interval $t_1$ increases to the value 36 of FIG. 6C, the states of conduction of triodes 22 and 25 begin to interchange. Consequently, the potential at the plate of triode 25 begins to rise and follows the dotted line segment 37 of FIG. 6E. At the same time, the full B+ plate potential of triode 22 (represented by the line segment 38 of FIG. 6E), begins to fall and follows dotted line segment 39.

FIG. 6D is a superimposed plot of three successive sawtooth waves occurring during time intervals $t_1$, $t_2$, $t_3$ of waveform 6B. Superimposed horizontal line 40 represents the y coordinate voltage of control stick 14. As previously mentioned, these sawtooth waves are applied to the grid of triode 24 while the y coordinate signal is applied to the grid of triode 27. In a manner similar to that described in connection with triodes 22 and 25, the states of conduction of triodes 24 and 27 interchange when the amplitude of the sawtooth passes through the interval designated $\Delta E_{g2}$.

Included in the superimposed waveforms of FIG. 6E are two additional waveforms representing the plate potentials of triodes 24 and 27 as a function of the amplitude of the sawtooth applied to the grid of triode 24. Assuming, for example, that triode 27 is initially conducting, its plate potential is represented by line segment 35. As the sawtooth, appearing during the $t_1$ interval of FIG. 6D, reaches the lower limit 41 of switching region $\Delta E_{g2}$, the potential at the plate of conducting triode 27 begins to rise and follows dotted line segment 42 of FIG. 6E. At the same time, the full B+ plate potential of triode 24 (represented by line segment 38) begins to fall and follows dotted line segment 43.

As was previously discussed, diodes 31, 32, 33, and 34 are so poled that the potential of terminal 30 of FIG. 5 follows the most positive potential which is applied to the individual diodes. Accordingly, the potential at output terminal 30 follows line segment 38 of FIG. 6, falls along dotted line segment 39 down to point 75, then rises along dotted line segment 42 and finally follows line segment 44. In this manner, a short negative pulse is produced at output terminal 30 in response to the application to comparator 19 of FIG. 4 of the sawtooth and x-coordinate voltages present during time interval $t_1$ of FIG. 6C and in response to the application to comparator 18 of the sawtooth and y-coordinate voltages present during time interval $t_1$ of FIG. 6D.

A similar result is obtained during time intervals $t_2$ and $t_3$. By reference to the waveform of FIG. 6E, it can be seen that the duration and amplitude of the negative pulses produced during time interval $t_2$ at terminal 30 of FIG. 5 are greater than those of the pulse produced during time interval $t_1$. During time interval $t_3$, however, both the duration and amplitude of the negative output pulse are decreased relative to those of the pulse produced during interval $t_2$. Thus it can be seen that as the position of shaft 12 of FIG. 4 rotates through the angular position corresponding to the $x$ and $y$ coordinate voltages representing the position of control stick 14, a succession of negative output pulses is produced at terminal 30 of FIG. 5. The duration and amplitude of each pulse of the succession increases from an initial zero, goes through a maximum, and then returns to zero.

The series of negative pulses appearing at output terminal 30 comprise the target designation gate previously referred to. In the event that the pulses at output terminal 30 were applied to the intensity modulation electrode of ground plane PPI 13 of FIG. 4, the designation gate 45 of FIG. 2 would be displayed. By inspection of the designation gate it can be seen that it is comprised of the intensified portions of a series of radial sweeps as the radar antenna is rotated through the azimuth position of the preselected target B. Each of the intensified radial sweep portions are produced by a corresponding one of the pulses of the succession of negative pulses produced at terminal 30 of FIG. 5.

The present invention is adapted to respond to the designation gate pulses appearing at terminal 30 to produce an unblanking signal for RHI 10 of FIG. 4 for the display thereon of targets lying within a predetermined azimuth sector symmetrically embracing the center of the designation gate shown in FIG. 2. Inasmuch as the area encompassed within the displayed boundaries of designation gate 45 is fixed, the angle $\alpha$ of intensified sweep portion 46 will vary as a function of the radial setting of designation gate 45. Consequently, in order to generate an unblanking signal to view a constant azimuth sector on RHI 10, it becomes necessary to variably delay the initiation of the unblanking signal (with reference to the azimuthal occurrence of intensified sweep signal 46) as a function of the range setting of designation gate 45. For example, in the illustrative case of FIG. 2, the start of the azimuth sector unblanking signal would be delayed an amount D relative to the occurrence of sweep portion 46 assuming the indicated azimuth rotation. The remainder of the structure shown in FIG. 4 is designed to effect such a result.

The succession of negative pulses at terminal 30 comprising the target designation gate is applied via summing circuit 47 to the intensity modulation electrode of RHI 10. The video output of transceiver 5 is also applied by summing circuit 47 to intensity modulate RHI 10.

The target designation gate is displayed on RHI 10 as indicated by the lightly shaded area of FIG. 3. An azimuth sector gating signal, applied via line 48 permits indication of only targets A, B, and C. It will be recalled that targets A, B, and C in the illustrative case presented in FIGS. 1 and 2 all lie within a predetermined azimuth sector which centrally encompasses the designated target of interest B.

For the production of the azimuth sector gating signal, the designation gate pulses at the output of peak selector 20 are applied to and actuate gate generator 49. Generator 49 may comprise a conventional monostable multivibrator which produces a negative-going output waveform having a leading edge synchronous with the first of the succession of designation pulses and having a trailing edge occurring at a predetermined time thereafter. The predetermined time is adjusted to be somewhat greater than the time interval occupied by the succession of target designation gate pulses. Such time can be calculated based on the known continuous rate of azimuth scan of antenna 2.

The pulse produced by generator 49 is applied to paraphase amplifier 50 in turn producing a pair of output pulses of opposite polarity. The output pulses are applied to respective ones of inhibiting gates 51 and 52 which selectively connect the output of cathode follower 53 to peak detector 54. The input to cathode follower 53 is derived from the ground range sweep output of resolver 8 appearing on line 70.

Figure 7:
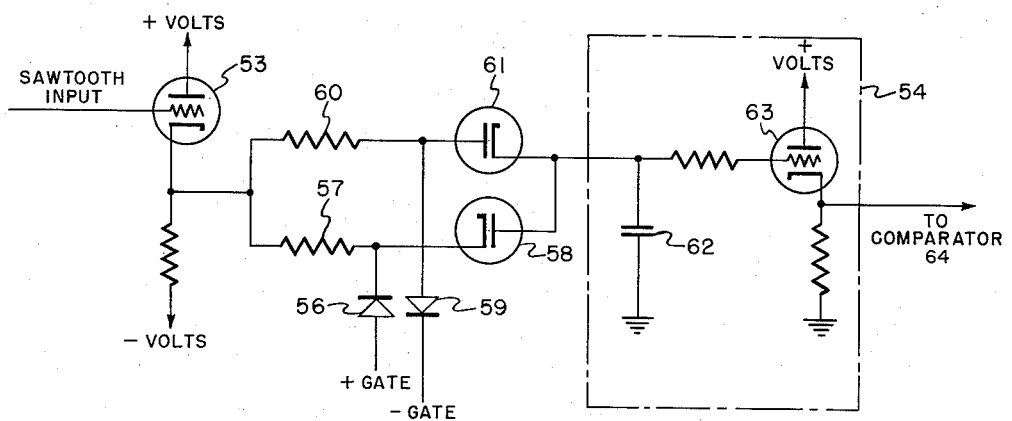
FIG. 7 is a schematic diagram of the sweep clamping circuits of FIG. 4.

The sweep clamping circuits 55, comprising cathode follower 53, gates 51 and 52, and peak detector 54 are shown in detail in FIG. 7. Referring to FIG. 7, the positive pulse output of amplifier 50 of FIG. 4 is applied via isolating diode 56 to the junction between resistor 57 and diode gate 58. The negative pulse output of amplifier 50 is applied via isolating diode 59 to the junction between resistor 60 and diode gate 61. Resistors 57 and 60 isolate the positive and negative pulse outputs of amplifier 50 from each other. Peak detector 54 consists of condenser 62 and cathode follower 63. The diode gates 58 and 61 provide selectable parallel current paths between the output of cathode follower 53 and the input to peak detector 54.

In operation, diode 61 normally conducts to apply the sawtooth signal output of cathode follower 53 to condenser 62. Condenser 62 rapidly follows the rising potential of the applied sawtooth because of the low impedance charging path presented by resistor 60 and the conduction resistance of diode 61. Upon the production of output pulses by amplifier 50, however, diodes 58 and 61 are both rendered non conductive thus isolating condenser 62 from the output of cathode follower 53. Condenser 62 stores the instantaneous value of the sawtooth immediately preceding the occurrence of the gating pulses and holds said stored value for the duration of the gating pulses. The stored value potential is available at the output of cathode follower 63 for application to a first input of comparator 64. Upon the cessation of the gating pulses, capacitor 62 is free to discharge through diode 58, resistor 57 and the cathode resistor of cathode follower 53.

The pulse produced at the output of generator 49, having a leading edge coincident with the start of the target designation gate is applied to delay circuit 65. Circuit 65 generates an exponentially decreasing voltage having decreasing instantaneous values bearing a predetermined time relationship relative to the leading edge of the negative-going pulse derived from the output of generator 49. It has been discovered that the amount of delay of the target designation gate necessary to cause intensified sweep segment 46 of FIG. 2 to lie along the same radial line of the PPI indication of FIG. 2 follows the value of such an exponential curve which is a plot of target ground range versus delay time. Delay function circuit 65 may include a simple R–C charging circuit with the negative-going output pulse of generator 49 being applied across the series connected R–C elements and the output exponential waveform being developed across the capacitive element.

The exponentially decreasing signal output of circuit 65 is applied to the second input of comparator 64. Comparator 64 produces an output pulse upon the equality in amplitude between the stored signal output of peak selector 54 proportional to target ground range and the exponentially decreasing voltage output of circuit 65. Thus, an output pulse is produced by comparator 64 at a variable time following the occurrence of the target designation gate inversely as a function of the ground range of the target designation gate. The azimuth sector gating signal, in turn, is produced by sector gate generator 66 in response to the output pulse of comparator 64. Generator 66 may consist of a conventional monostable multivibrator producing an output pulse having a leading edge coincident with the occurrence of the output pulse of comparator 64 and a trailing edge occurring at a preselected time thereafter. The preselected time is chosen, relative to the constant azimuth scanning rate of antenna 2, to intensify RHI 10 for a period of time corresponding to the traversal of antenna 2 through a constant azimuth sector.

From the preceding it can be seen that the objects of the present invention have been achieved by the provision of target designation gate generating means for the preselection of a target of interest out of a plurality of targets being received by an azimuthally scanning radar. Auxiliary target data indication means, such as an RHI, is provided for the display of data respecting targets lying within a predetermined azimuth sector embracing the central azimuth of the target designation gate. A sector gate is generated after a time delay, following the azimuthal initiation of the designation gate, dependent upon and inversely proportional to the range of the designation gate. The sector gate actuates the auxiliary indicator for a predetermined time interval corresponding to the time required for the traversal of the radar scanning means through a predetermined azimuth sector. Thus, although the auxiliary target data indicator is triggered into operation by the designation gate, the same azimuth sector is displayed thereon irrespective of the range of the target designation gate.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A radar target indicating system adapted to receive elevation and azimuth signals representing the position of a scannable radar beam in space, video signals representing the interception of targets by said beam, and a slant range timing signal; said indicating system comprising means responsive to said slant range and elevation signals for producing a first pair of sweep signals comprising a ground range and height signal, means responsive to said ground range and azimuth signals for developing a second pair of sweep signals representing rectilineal ground plane coordinates, means responsive to said second pair of sweep signals and to a pair of first control signals representing the rectilineal ground-plane coordinates of a particular target of interest to produce a target designating signal once each azimuth scanning cycle of said radar, said designating signal occurring during a time interval encompassing the time at which the radar beam is oriented along the azimuth of said particular target of interest and the target is being intercepted by said beam, means for developing a second control signal concurrently with the initiation of said designating signal, azimuth sector gate generation means responsive to said second control signal and to said ground range signal for the production of an indicator actuating signal, said last-named means including a peak detector, gating means for applying said ground range signal to the input of said peak detector, said gating means being actuated by said second control signal and producing an output signal proportional to the peak amplitude of said ground range signal during the actuation of said gating means, a delay function circuit for producing an exponentially decreasing signal in response to said second control signal, and a signal comparator adapted to receive said output signal and said exponentially decreasing signal for producing said actuating signal when the amplitude of said exponentially decreasing signal equals the amplitude of said output signal; a target indicator, and means for applying said first pair of sweep signals, said video signals and said actuating signal to said target indicator.

2. An indicating system as defined in claim 1 further including means for applying said designating signal to said target indicator.

3. An indicating system as defined in claim 1 wherein said means to produce said target designating signal comprises first and second signal comparators, each comparator being adapted to receive respectively corresponding ones of said second pair of sweep signals and said pair of first control signals, and a peak selector having inputs connected to the outputs of said comparators, said target designating signal being developed at the output of said peak selector.

4. An auxiliary radar target indicating system for the display of data supplementary to that presented on a ground-plane plan position indicator responsive to rectilineal coordinate deflection signals, said auxiliary indicator being adapted to receive the deflection signals of said plan position indicator, radar ground range and height timing signals and radar target video signals, said auxiliary indicating system comprising means responsive to said deflection signals and to a first control signal representing the rectilineal ground-plane coordinates of a particular target of interest to produce a target designating signal once each azimuth scanning cycle of said radar, said designating signal occurring during a time interval encompassing the time at which the radar beam is oriented along the azimuth of said particular target of interest and the target is being intercepted by said beam, means for developing a second control signal concurrently with the initiation of said designating signal, azimuth sector gate generation means responsive to said second control signal and to said ground range signal for the production of an indicator actuating signal; said last-named means including a peak detector, gating means for applying said ground range signal to the input of said peak detector, said gating means being actuated by said second control signal and producing an output signal proportional to the peak amplitude of said ground range signal during the actuation of said gating means, a delay function circuit for producing an exponentially decreasing signal in response to said second control signal, and a signal comparator adapted to receive said output signal and said exponentially decreasing signal for producing said actuating signal when the amplitude of said exponentially decreasing signal equals the amplitude of said output signal, an auxiliary radar target indicator, and means for applying said ground range and height timing signals, said radar target video signals and said actuating signal to said auxiliary indicator.

5. An indicating system as defined in claim 4 further including means for applying said designating signal to said auxiliary target indicator.

6. A signal generator for the actuation of auxiliary radar target display means for the indication of target data supplementary to that presented on a plan position indicator, said generator being adapted to receive the coordinate deflection signals of said plan position indicator and a radar ground range timing signal, said generator comprising means responsive to said deflection signals and to a pair of first control signals representing the ground-plane coordinates of a particular target of interest to produce a target designating signal once each azimuth scanning cycle of said radar, said designating signal occurring during a time interval centrally embracing the time at which the radar beam is oriented along the azimuth of said particular target of interest and the target is being intercepted by said beam, means responsive to said designating signal for developing a second control signal concurrently with the initiation of said designating signal, and azimuth sector gate generation means responsive to said second control signal and to said ground range timing signal for the production of an indicator actuating signal; said last-named means including a peak detector, gating means for applying said ground range signal to the input of said peak detector, said gating means being actuated by said second control signal and producing an output signal proportional to the peak amplitude of said ground range signal during the actuation of said gating means, a delay function circuit for producing an exponentially decreasing signal in response to said second control signal, and a signal comparator adapted to receive said output signal and said exponentially decreasing signal for producing said actuating signal when the amplitude of said exponentially decreasing signal equals the amplitude of said output signal.

7. A signal generator as defined in claim 6 wherein said means to produce said target designating signal comprises first and second signal comparators, each comparator being adapted to receive respectively corresponding ones of said second pair of sweep signals and said pair of first control signals and a peak selector having inputs connected to the outputs of said comparators, said target designating signal being developed at the output of said peak selector.

References Cited in the file of this patent

UNITED STATES PATENTS

| | | |
|---|---|---|
| 2,585,855 | Sherwin | Feb. 12, 1952 |
| 2,692,381 | Huber | Oct. 19, 1954 |